Figure 1:
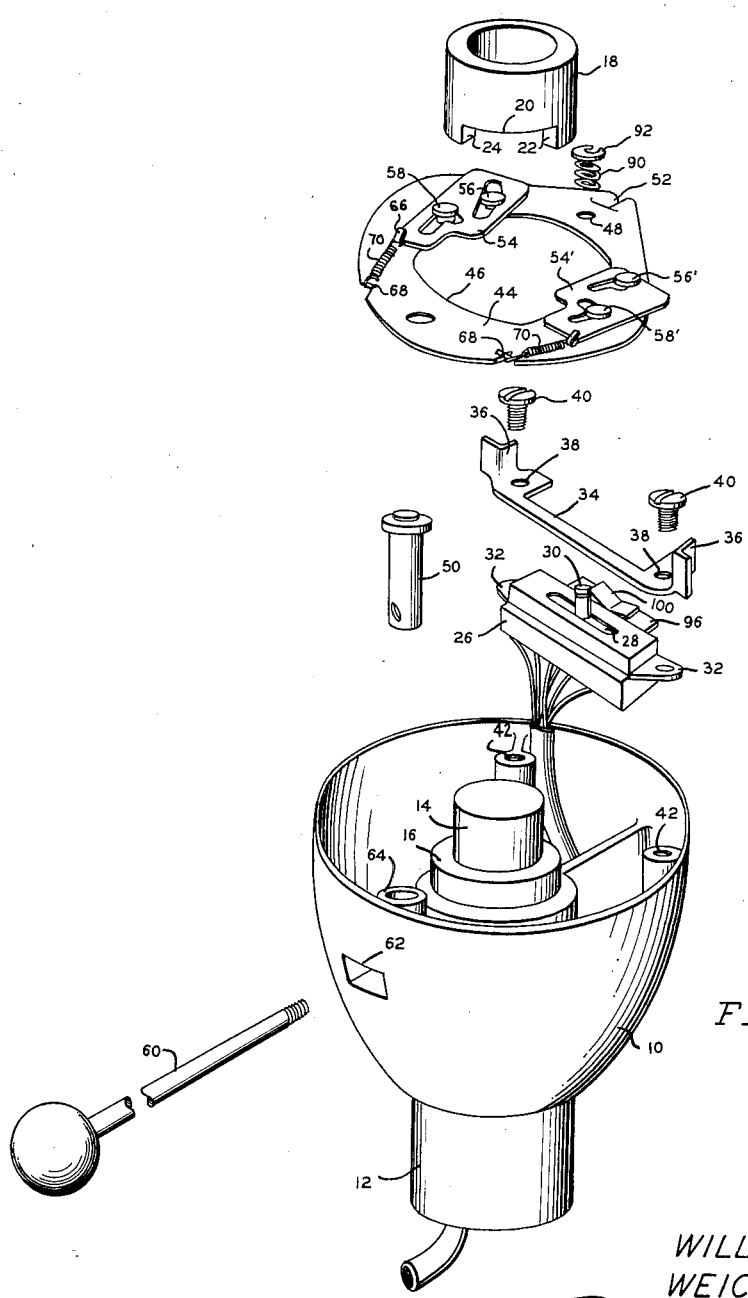

Aug. 17, 1965

W. H. FISHER ETAL 3,201,536

TURN SIGNAL APPARATUS WITH AUTOMATIC PREMATURE
PREVENTION CANCELLING MEANS

Filed May 21, 1962

3 Sheets-Sheet 1

INVENTORS
WILLIAM H. FISHER
WEICHIEN CHOW

BY Beaman Beaman

ATTORNEY

Aug. 17, 1965

W. H. FISHER ETAL 3,201,536

TURN SIGNAL APPARATUS WITH AUTOMATIC PREMATURE
PREVENTION CANCELLING MEANS

Filed May 21, 1962

3 Sheets-Sheet 2

INVENTORS
WILLIAM H. FISHER
WEICHIEN CHOW

BY Beaman & Beaman

ATTORNEY

INVENTORS
WILLIAM H. FISHER
WEICHIEN CHOW

BY Beaman & Beaman

ATTORNEY

United States Patent Office 3,201,536
Patented Aug. 17, 1965

3,201,536
TURN SIGNAL APPARATUS WITH AUTOMATIC PREMATURE PREVENTION CANCELLING MEANS
William H. Fisher, Vandercook Lake, Mich., and Weichien Chow, Park Forest, Ill., assignors to Sparton Corporation, Jackson, Mich., a corporation of Ohio
Filed May 21, 1962, Ser. No. 196,350
6 Claims. (Cl. 200—61.34)

The invention pertains to vehicle turn signal apparatus, and in particular pertains to turn signal apparatus wherein automatic means cancel the turn signal once the indicated turn has been accomplished, and such canceling will not occur until the indicated turn has taken place.

The majority of turn signal devices employed on present-day vehicles employ automatic means for canceling the signal after the turn is completed. The cancellation operation is activated by the steering wheel or steering wheel shaft rotating in the direction opposite to that which produces the indicated vehicle turn. While conventional automatic canceling turn signal devices perform satisfactorily in most instances, it is a relatively common occurrence to have the turn signal apparatus cancel itself before the indicated turn has taken place. Such premature canceling is caused by the driver "swinging out" to make the desired turn after indicating the turn with the turn signal apparatus. Such premature canceling is a very common and annoying occurrence with large vehicles such as trucks and buses, as it is common practice for such vehicles to first turn in a direction opposite to that desired to provide the necessary clearance to accomplish the indicated turn to clear curbs, corner posts, etc.

The above-described premature canceling occurs, of course, due to the fact that the steering wheel is rotated in the direction opposite to that which will produce the indicated turn and, thus, cancel the turn signal. Safety requirements dictate that the vehicle turn be indicated a sufficient interval before the turn takes place to permit the drivers of other vehicles to be aware of the intentions of the turning vehicle. Thus, the driver of large vehicles usually has to activate the turn signal twice for each turning operation where it is necessary to 'swing out" to make a turn. The first turn signal actuation occurs at a safe distance before the turn will take place, and the subsequent actuation of the turn signal is necessary, after the signal has been canceled due to the "swing out," to continue the operation of the turn signal.

It is the basic object of the invention to provide vehicle turn signal apparatus which is self-canceling. However, cancellation of the apparatus does not take place until the indicated turn has been accomplished. Thus, when employing the apparatus in accord with the invention, rotation of the steering wheel and shaft in a direction opposite to that of the indicated turn to cause the vehicle to "swing out" from the direction of the indicated turn will not cancel the turn signal apparatus. While rotation of the steering mechanism in the direction opposite to that necessary to make the indicated turn provides the cancellation actuation, such cancellation operation must be proceeded by a rotation of the steering shaft in the direction of the indicated turn.

Another object of the invention is to provide vehicle turn signal apparatus as described above which is economical to manufacture and dependable in operation.

A further object of the invention is to provide turn signal apparatus in accord with the basic purpose of the invention which may be primarily manufactured from stamped sheet stock, and wherein commercially available switch components may be employed.

Another object of the invention is to provide vehicle turn signal apparatus wherein cancellation is accomplished through a pivoted dog mounted upon a switch actuator, and the dog is movable between inoperative and operative positions, the dog being moved to the operative position only upon rotation of the steering mechanism in the direction of the indicated turn.

Figure 2:
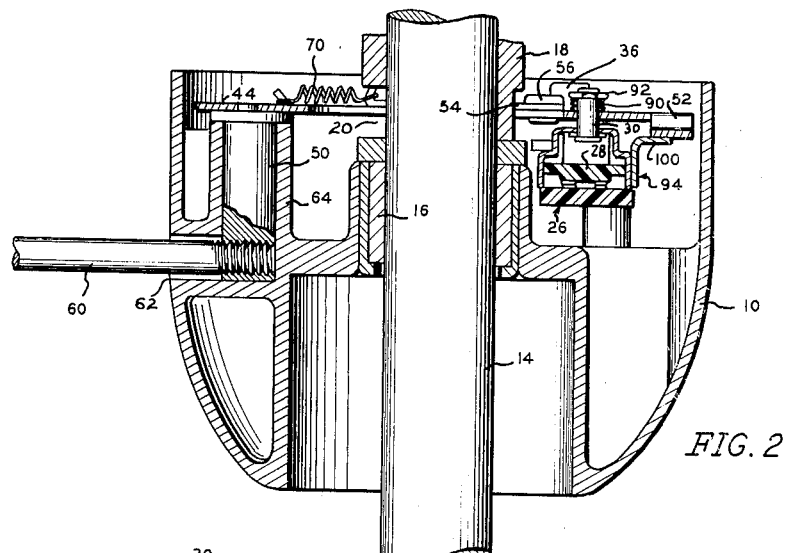
Figure 10:
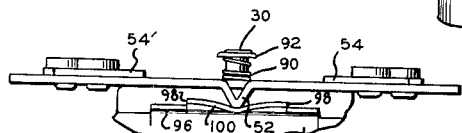
Figure 11:
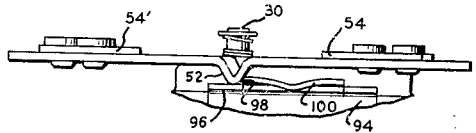
Figure 4:
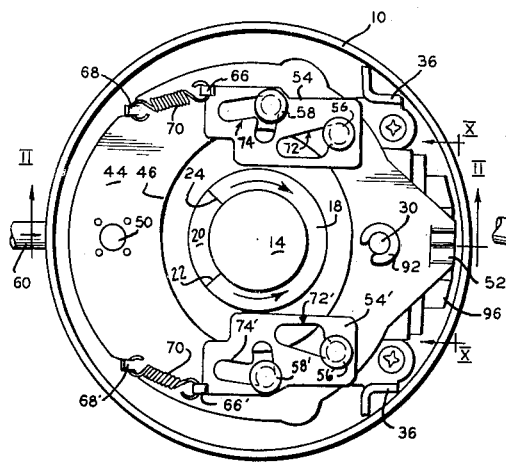
Figure 5:
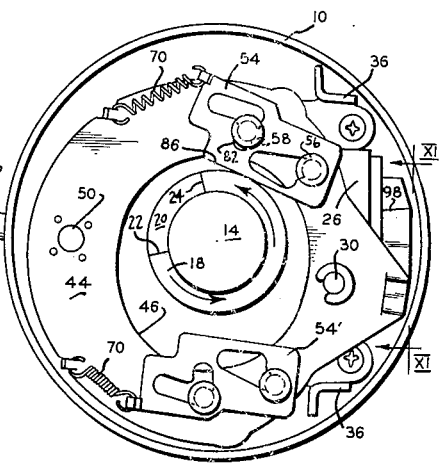
Figure 3:
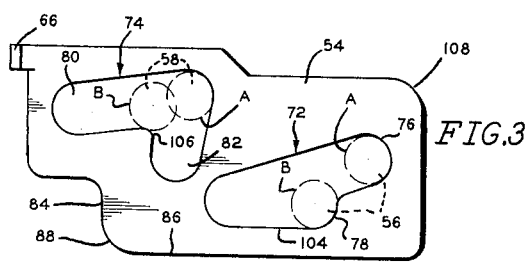

These and other objects of the invention arising from the details and relationships of the components of an embodiment thereof will be apparent from the following description and accompanying drawings wherein:

FIG. 1 is an exploded perspective view of the turn signal apparatus in accord with the invention, and the steering column housing in which the signal apparatus is mounted, FIG. 2 is an elevational, sectional view of the steering column turn signal housing, steering shaft, and steering wheel hub, FIG. 3 is a detail, enlarged view of a reset dog showing the positions of the mounting pins in dotted lines at the operative and inoperative positions of the dog, FIGS. 4 through 9 are plan views of the turn signal apparatus and steering wheel hub during various phases of the turning operation, FIG. 10 is an elevational, detail view of the detent structure as taken along section X—X of FIG. 4 and, FIG. 11 is a detail, elevational view of the detent means as taken along section XI—XI of FIG. 5.

In the described embodiment the turn signal apparatus is preferably mounted within a housing 10 attached to the steering column 12 directly below the vehicle steering wheel, not shown. It will be appreciated that the concepts of the invention may be practiced in other types of installation than that disclosed, and that the following description merely discloses one arrangement which is possible with turn signal apparatus and steering apparatus components.

The hollow housing 10 may be of a cast metal construction, and is mounted to the top of steering column 12. The steering shaft 14 concentrically extends through the housing 10, and a bearing 16, FIG. 2, may be employed between the shaft and housing. At the upper end of the steering shaft 14 the steering wheel, not shown, is mounted, and includes a hub 18 of annular configuration which is affixed to the shaft 14 for rotation therewith. The hub 18 is provided with a notch 20 defined by radially extending abutment surfaces 22 and 24 disposed 90° with respect to each other. The notch 20 and abutment surfaces are for the purpose of canceling the turn signal apparatus, and such structure is conventional in the automotive field.

The components of the turn signal apparatus, in accord with the invention, are best illustrated in FIG. 1, and basically include a switch 26 of the linear sliding-type, having a sliding contact block 28 which may be moved by an upstanding pin 30 in either direction from the central, neutral position illustrated. Depending upon the direction of movement of the contact block from the central position, appropriate contacts will be closed to energize the appropriate turn signal lamps. The switch structure includes a pair of ears 30 having holes defined therein for mounting purposes, and also includes detent positioning means formed of sheet metal which are best illustrated in FIGS. 10 and 11, and described in detail later.

A plate 34 having a pair of upstanding dog reset abutment projections 36 is provided with a pair of holes 38 for alignment with the holes in the ears 32, such that the plate 34 may be mounted to the switch 26 wherein the projections 36 will extend upwardly in the same direction as the switch pin 30. Screws 40 are employed to attach the plate 34 and switch 26 together within the housing 10 by means of threaded holes 42 defined in bosses cast into the housing 10. If desired, the plate 34 may be welded to the ears 32 to form a more rigid assembly between the switch and plate.

The switch pin 30 is actuated by a switch actuator plate 44, having a central opening 46 and a hole 48 defined therein for closely receiving the pin 30. A cylindrical, downwardly-extending bearing support member 50 is welded to the underside of the switch actuator plate 44, and in opposed diametrical relation the plate 44 is downwardly deformed by lancing to provide a V-shaped detent 52, FIG. 10. A pair of reset dogs 54 is mounted upon the switch actuator plate 44 in substantially diametrically opposed relation with respect to opening 46. Each of the dogs is slidably mounted upon the plate by means of pins 56 and 58 affixed to the plate, extending through slots defined in the dog. The pins are provided with enlarged heads of a diameter greater than the slot widths.

The steering shaft 14 extends through the opening 46 of the switch actuator plate 44, and the hub is received therein such that the steering wheel hub notch 20 will be axially aligned with the reset dogs 54. The bearing shaft 50 is provided with a transversely disposed threaded hole for receiving the threaded end of an operating handle 60 which extends through an opening 62 within the housing 10. From FIG. 2 it will be appreciated that the bearing member 50 is rotatably mounted within a bearing portion 64 formed in the housing 10.

The specific configuration of the reset dogs will be best appreciated from FIG. 3. Only one reset dog will be described in detail, and similar components of the other dog are indicated by primes. The dogs 54 are formed of hardened sheet steel stock, and are provided with an upstanding, lanced projection 66 which serves as a spring anchor. The switch actuator plate is also provided with lanced, upstanding projections 68 which serve as the other anchor of a tension spring 70. The spring 70 maintains a constant biasing force upon the associated reset dog. Each of the reset dogs is provided with two slots, 72 and 74. As only one reset dog is described in detail, it will be understood that the other dog is provided with similar slots which function in an identical manner, one of the dogs being operative during a right turn and the other being employed during a left turn. The slot 72 generally extends in a tangential direction with respect to the path of movement of the steering hub abutment edges. This slot is provided with an arcuate end 76 and an arcuate shoulder 78 disposed closer to the hub 18 than the end 76. The radius of the end 76 and the shoulder 78 conforms to the radius of the pin 56, which is received within the slot 72. The other slot 74 defined in the reset dogs consists of a portion 80 which substantially extends in the same direction as the general configuration of the slot 72, and a portion 82 which extends substantially radially with respect to the steering shaft. The width of the portions 80 and 82 is slightly larger than the diameter of the pin 58 received within the slot 74, and the heads of the pins are spaced from the switch actuator plate a sufficient distance to permit free sliding movement of the dogs upon the actuator plate in the directions permitted by the slots. The slot portion 80 serves as an abutment, as will be described, and the exterior dog edges 84 and 86 function as operative surfaces. The surfaces 84 and 86 are connected by a radius 88. The dog described in FIG. 3 is that rendered operative when making a right turn.

As previously mentioned, the switch contact block pin 30 extends through the hole 48 defined in the switch actuator, and a compression spring 90 is interposed between the switch actuator and a washer 92 mounted upon the pin to bias the switch actuator plate downwardly. This biasing action insures an operative interconnection of the detent 52 and the detent structure mounted upon the switch.

The switch mounted detent means is formed on an angle plate 94 welded to the switch. The horizontal portion 96 of the angle plate is slit at spaced locations and bent upwardly to define shoulders 98, and the portion 96 intermediate shoulders 98 is formed to define a V track 100 having an apex aligned with the neutral position of switch pin 30.

The operation of the turn signal apparatus according to the invention is as follows:

FIG. 4 illustrates the turn signal apparatus relationships at the normal or neutral condition. The switch actuator plate 44 is centered with respect to the hub 18 and shaft 14, and the detent 52 will be located within the apex portion of the detent track 100 defined on the switch. The reset dogs 54 will not engage the steering wheel hub 18, as they will be maintained in the position shown by the pins 56 and 58 which will be located in positions A, shown in FIG. 3, within their respective slots, due to the biasing force produced by spring 70.

Figure 6:
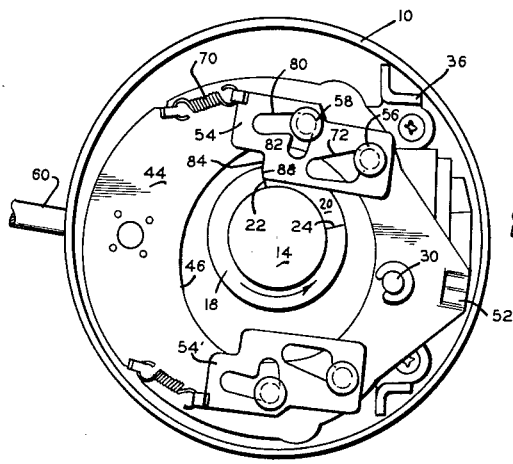

Upon the vehicle driver desiring to make a right turn, the handle 60 is rotated clockwise, FIG. 5, causing the bearing member 50 to rotate and rotating the switch actuator plate 44 about the axis of the bearing member. This movement causes the actuator detent 52 to ride out of the detent track recess 100, compressing spring 90 momentarily, and then dropping the detent to the angle plate portion 96. Movement of the switch actuator plate back to its original centered position is prevented by the engagement of the left shoulder 98 of the detent track 100 with the switch actuator detent 52, as shown in FIG. 11. The resultant eccentric relationship of the switch actuator 44 to the hub 18 will move the reset dog 54 into engagement with the hub, as the relationships of the spring anchors 66 and 68 with the pins 56 and 58 cause the biasing force imposed upon the dogs 54 to have an inward vector toward the hub. In the position of FIG. 5, the reset dog 54 is pivotally mounted about the pin 56, and the left end of the dog is capable of pivoting action toward and away from the hub due to the radial movement permitted by the slot portion 82. The arrows of FIG. 5 indicate that the steering wheel and hub are being rotated in a direction permitting the vehicle to "swing out" from the indicated turn to provide the proper clearance of the curb or corner. As the hub is so rotated the dog 54 will drop into the notch 20 at each revolution of the steering wheel hub, as indicated in FIG. 6. The engagement of the outer edge of abutment surface 24 with the dog edge 86 merely pivots the reset dog about the pin 56 relative to the switch actuator plate, and will not cancel the indicated turn signal, as produced by the shifting of pin 30 and block 28 when the switch actuator plate was moved from the position of FIG. 4 to that of FIG. 5.

Figure 7:
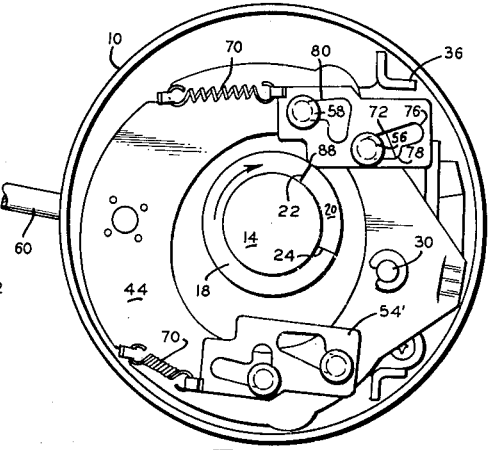
Figure 8:
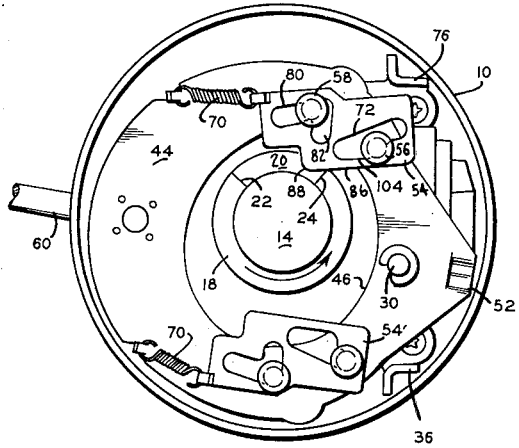
Figure 9:
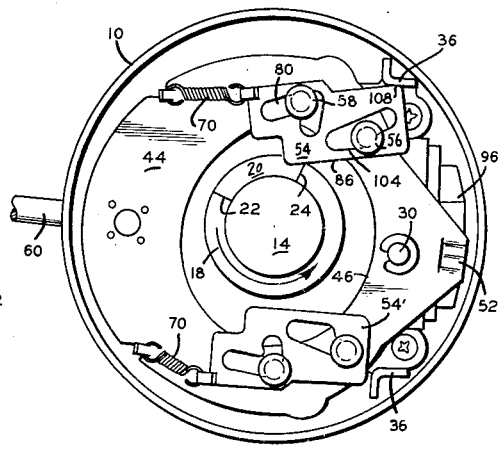

When the steering wheel and steering wheel hub are rotated in the direction to produce the indicated turn, the hub abutment surface 22 will engage the reset dog edge 84 in the manner shown in FIG. 6, shifting the reset dog to the position illustrated in FIG. 7. It will be noted that the dog is now shifted such that pin 56 is to the left within the slot 72, and the pin 58 is now located within the slot portion 80. Continued rotation of the hub during the indicated turn causes the dog to shift between a position similar to that of FIG. 7 wherein radius 88 will engage the circumference of the hub and the position of FIG. 8 wherein radius 88 enters notch 20. Upon the hub being rotated in the direction of FIG. 7 to the extent where the dog edge 86 will slide past the edge of the abutment surface 24, as shown in FIG. 8, the spring tension on the dog will cause the dog to slide from the position of FIG. 7 of that of FIG. 8. However, due to the fact that the axis of spring 70 lies outside of the pin 58, movement of the dog to the position of FIG. 7 will tend to bias the dog in a pivotal movement about pin 58, within slot portion 80, in a counterclockwise direction, causing the pin 56 to be in engagement with the edge 104 of slot 72. Thus, the action of the spring 70 upon the dog will pull the dog to the left, FIG. 8, upon alignment of the edge 86 with the notch 20 to the extent wherein pin 56 will engage shoulder 78, and the pin locations will be as represented by the positions B shown in FIG. 3. At this position it will also be noted that the pin 58 is within the slot portion 80, and the corner 106 will be engaging the pin. This position of the reset dog is designated the "cocked" position, and any force imposed upon the edge 86 in an outward direction will be directly transmitted to the actuator plate 44 for reasons later described. The dog 54 is capable of movement in a direction subtsantially tangential to the path of movement of the hub between the positions of FIGS. 7 and 8 to permit rotation of the hub during the indicated turn without affecting the switch actuator plate position.

After the right turn has been completed, the steering hub is rotated in the counterclockwise direction to straighten the vehicle wheels and recover from the turn, and upon the first alignment of the notch 20 with the radius 88, the spring tension on the dog shifts the dog to the position of FIG. 8 into the notch. Thereupon, the outer edge of the abutment surface 24 will engage the dog edge 86, as shown in FIG. 8, imposing a radial force in an outward direction upon the dog. As the slot portion 80 and corner 106 are engaging pin 58 and pin 56 is engaging slot edge 104, engagement of the abutment edge 24 with the dog edge 86 while the hub is rotating in the canceling direction, will directly impose a radial force upon the switch actuator plate 44, causing the detent 52 to ride over the shoulder 98 of the track 100, FIG. 11, into the track 100, causing the pin 30 to shift the switch contact block 28 and cancel the indicated turn signal. The tension of spring 90 will locate detent 52 in the apex of the track centering the plate 44. As the switch actuator is being returned to the center or neutral position, the corner 108 of the dog 54 will engage the adjacent projection 36, FIG. 9. This engagement momentarily prevents the right end of the dog from shifting with the switch actuator plate during the final movements of the switch actuator plate toward the center position, permitting the pin 56 to ride over the shoulder 78. The spring tension upon the dog 54 then returns the dog to the position of FIG. 4 and out of the "cocked" position. The turn signal apparatus is now de-energized and is ready for the next cycle of operation.

It will be appreciated that if a left turn is to be indicated that the sequence of operation is similar, only the dog 54′ will be in engagement with the steering wheel hub and operated by the hub abutment surfaces.

Supposing a right turn is to be made without rotating the steering wheel to cause the vehicle to "swing out," the actuator plate 44 will be shifted to the position of FIG. 5, as described above. However, the initial direction of rotation of the hub 18 will be clockwise, rather than counterclockwise. Upon alignment with the dog radius 88 with the notch 20, the dog will drop into the notch, as shown in FIG. 6, and immediately be "cocked," as shown in FIG. 7. The sequence of operation is then as described in conjunction with FIGS. 8 and 9.

It will be appreciated that the above-described turn signal apparatus permits the steering wheel to be rotated in the direction opposite to that of the indicated turn without canceling the turning signal. Rotation of the steering wheel hub in the direction of the indicated turn is necessary to shift the operative reset dog to the "cocked" position before cancellation will take place. Thus, the deficiencies of known turn signal devices, with regard to premature canceling, are obviated with an attendant increase in vehicle safety conditions. The components of the invention may be easily manufactured and by hardening the pins 56 and 58 and the reset dogs 54, dependability of operation over thousands of operating cycles is obtainable.

It will be understood that various modifications to the disclosed embodiment may be apparent to those skilled in the art without departing from the spirit and scope of the invention, and it is intended that the invention be defined only by the following claims.

We claim:
1. Turn signal switch actuating apparatus comprising, in combination, a vehicle steering shaft having abutment means affixed thereto, a switch, a switch actuator movably mounted with respect to said shaft and connected to said switch for opening and closing said switch, manual positioning means connected to said switch actuator, releasable detent means retaining said actuator in the selected position, a switch actuator reset dog mounted upon said switch actuator and movable into an engagable position with the steering shaft abutment means upon closing of said switch, means mounting said dog upon said actuator for movement thereon whereby said dog when engagable with said abutment means overrides said abutment means regardless of the initial direction of rotation of said steering shaft, said means mounting said dog on said actuator including means permitting said abutment to shift said dog on said actuator to a cocked position capable of resetting said actuator only upon said dog being engaged by said abutment means while said steering shaft is rotated in the direction of the indicated turn, engagement of said abutment means and said dog when in the cocked position during rotation of the steering shaft in the opposite direction to the indicated turn shifting said switch actuator to the position opening said switch.

2. In a turn signal switch actuating apparatus, as in claim 1, wherein right and left turn reset dogs are associated with said switch actuator, only one of said dogs being engaged by said abutment means at a time.

3. Turn signal switch actuating apparatus comprising, in combination, a rotatable steering shaft having abutment means affixed thereto, a switch, a switch actuator having portions disposed on opposite sides of said shaft rotatably mounted upon an axis spaced from the axis of said shaft, means connecting said actuator to said switch, manually operated means connected to said actuator for rotation of the same to energize said switch and indicate a turn, such rotation of said actuator eccentrically positioning said actuator to said steering shaft, releasable detent means retaining said actuator in the selected switch energizing and de-energizing positions, an actuator reset dog mounted upon each of said actuator portions, one of said dogs being moved into the path of said abutment means upon movement of said actuator to a switch energizing turn indicating position, means mounting said dogs upon said actuator rendering said dog within the abutment path inoperative to shift said actuator to a switch de-energizing position upon being engaged by said abutment until said shaft is rotated in the direction of the indicated turn, said means mounting said dogs on said actuator permitting movement of said dogs relative to said actuator between first and second positions and including pivot means pivotally mounting said dogs relative to said actuator at said first position, means fixing said dogs to said actuator in said second position against movement in a given direction, the operative dog shifting said actuator to a switch de-energizing position being engaged by said abutment means while said shaft is rotating in a direction counter to the indicated turn, said abutment means shifting said dog within the abutment means path from said first position to said second position during rotation of said shaft in the direction of the indicated turn.

4. In a turn signal switch actuating apparatus, as in claim 3, wherein said pivot means mounting said dogs on said actuator comprises a pivot pin fixed in said actuator, a first slot defined in said dogs having first and second shoulders and receiving said pivot pin, said slot being substantially tangentially disposed to the abutment means path of rotation, biasing means biasing said dogs maintaining engagement of said pivot pin and a slot shoulder, dog pivot limiting means mounted on said actuator limiting pivoting of said dog while in said first postion and said pivot pin is engaging said first shoulder, said pivot limiting means preventing movement of said dog relative to said actuator in a direction transverse to said slot when said dog is in said second position wherein said pivot pin engages said second shoulder.

5. In a turn signal switch actuating apparatus, as in claim 4, wherein said dog pivot limiting means comprises a second slot defined in said dogs and a second pin affixed to said actuator extending through said second slot, said second slot having a first portion transversely disposed to said first slot and aligned with said second pin when said dogs are in said first position, and a second position substantially parallel to said first slot.

6. Turn signal switch actuating apparatus comprising, in combination with a rotatable steering shaft having abutment means affixed thereto, a switch, a switch actuator rotatably mounted upon an axis spaced from the axis of said shaft and having portions disposed on opposite sides of said shaft, means operatively connecting said actuator to said switch, manually operated means connected to said actuator for rotation of the same to energize said switch and indicate a turn, such rotation of said actuator eccentrically positioning said actuator to said steering shaft, releasable detent means retaining said actuator in the selected switch energizing and de-energizing position, an actuator reset dog mounted upon each of said actuator portions, one of said dogs being moved into the path of said abutment means upon movement of said actuator to a switch energizing turn indicating position, first and second slots defined in said dogs, said first slot being substantially tangentially to the path of the abutment means and said second slot having a first portion substantially parallel to said first slot, said second slot including a second portion transversely disposed to said first slot portion, first and second spaced shoulers defined in said first slot, first and second pin members mounted on said actuator extending into said first and second slots, respectively, said second pin aligning with said second slot first and second portions upon said first pin engaging said first shoulder and said second pin lying within said second slot portion upon said first pin engaging said second shoulder, and spring means biasing said dogs in a direction maintaining engagement of said first pin with the selectively engaged shoulder.

References Cited by the Examiner

UNITED STATES PATENTS

| | | | |
|---|---|---|---|
| 2,525,033 | 10/50 | Hollins | 200—61.34 |
| 2,643,308 | 6/53 | Lincoln et al. | 200—61.34 |
| 2,739,196 | 3/56 | Spicer | 200—61.34 |
| 2,800,541 | 7/57 | Brown et al. | 200—61.34 |
| 2,800,542 | 7/57 | Barcus et al. | 200—61.34 |
| 2,815,412 | 12/57 | Spicer | 200—61.34 |

BERNARD A. GILHEANY, *Primary Examiner.*

ROBERT K. SCHAEFER, *Examiner.*